United States Patent
Wölfing et al.

(10) Patent No.: US 9,992,840 B2
(45) Date of Patent: Jun. 5, 2018

(54) CONTROLLED COLOR LIGHT SOURCE

(71) Applicant: SCHOTT AG, Mainz (DE)

(72) Inventors: Bernd Wölfing, Mainz (DE); Thomas Reichert, Wackernheim (DE); Andreas Dietrich, Guldental (DE); Andreas Schneider, Neu-Bamberg (DE); Björn Bleisinger, Riesweiler (DE); Marc Timon Sprzagala, Mainz (DE); Martin Cramer, Wiesbaden (DE); Oliver Keiper, Hünstetten (DE); Sandra Mattheis, Eltville (DE)

(73) Assignee: SCHOTT AG, Mainz (DE)

( * ) Notice: Subject to any disclaimer, the term of this patent is extended or adjusted under 35 U.S.C. 154(b) by 0 days. days.

(21) Appl. No.: 15/158,946

(22) Filed: May 19, 2016

(65) Prior Publication Data

US 2016/0270183 A1  Sep. 15, 2016

Related U.S. Application Data

(63) Continuation of application No. PCT/EP2014/075295, filed on Nov. 21, 2014.

(51) Int. Cl.
*H05B 33/08* (2006.01)
*F21V 23/04* (2006.01)
(Continued)

(52) U.S. Cl.
CPC ....... *H05B 33/0869* (2013.01); *F21V 21/005* (2013.01); *F21V 23/0457* (2013.01);
(Continued)

(58) Field of Classification Search
CPC . B29C 2045/0087; B29C 33/00; B29C 33/42; B29L 2011/0075; B60Q 1/26;
(Continued)

(56) References Cited

U.S. PATENT DOCUMENTS 6,092,904 A * 7/2000 Tai ........................... F21V 5/02
362/23.15
2005/0001142 A1  1/2005 Lauffenburger et al.
(Continued)

FOREIGN PATENT DOCUMENTS

DE  602004005714  1/2008
DE  102010043296  5/2012
(Continued)

OTHER PUBLICATIONS

English translation of International Search Report dated May 28, 2015 for corresponding International Application No. PCT/EP2014/075187.

(Continued)

*Primary Examiner* — Alexander H Taningco
*Assistant Examiner* — Renan Luque
(74) *Attorney, Agent, or Firm* — Ohlandt, Greeley, Ruggiero & Perle, L.L.P.

(57) ABSTRACT

A light source is provided that includes at least two semiconductor light-emitting elements that emit light of different color, a light guide, an electronic control unit, and a light sensor. The light emitted by the elements is injected, at least partially, into the light guide and exits laterally from the light guide. The brightness of the elements can be adjusted by the electronic control unit. The light sensor is arranged to receive the light injected by the elements and laterally exiting from the light guide. The electronic control unit accumulates sensor signals from the light sensor over an integration time interval and compares the accumulated signals with a target value or range to determine a difference, changes a brightness of the elements in response to the difference, and changes the integration time interval in response to the difference or to a change in the target value.

21 Claims, 6 Drawing Sheets

(51) Int. Cl.
*H05B 37/02* (2006.01)
*F21V 21/005* (2006.01)
*F21V 8/00* (2006.01)
*F21V 7/00* (2006.01)
*F21V 7/22* (2018.01)
*F21Y 115/10* (2016.01)
*F21Y 113/13* (2016.01)

(52) U.S. Cl.
CPC ....... *G02B 6/0096* (2013.01); *H05B 33/0851* (2013.01); *H05B 37/0227* (2013.01); *H05B 37/0281* (2013.01); *F21V 7/005* (2013.01); *F21V 7/22* (2013.01); *F21Y 2113/13* (2016.08); *F21Y 2115/10* (2016.08)

(58) Field of Classification Search
CPC ......... B60Q 1/2696; B60Q 1/30; F21S 48/20; F21S 48/2218; F21V 13/02; F21V 5/02; F21V 9/16; F21V 23/0457; F21V 21/005; F21V 7/005; F21V 7/22; F21W 2101/00; F21W 2101/12; F21W 2101/14; F21Y 2101/00; F21Y 2113/13; F21Y 2115/10; G02B 6/0008; G02B 6/0011; G02B 6/0016; G02B 6/0018; G02B 6/0028; G02B 6/0031; G02B 6/0043; G02B 6/0046; G02B 6/005; G02B 6/0053; G02B 6/0055; G02B 6/0058; G02B 6/0061; G02B 6/0065; G02B 6/0068; G02B 6/0085; G02B 6/0096; H05B 33/0869; H05B 33/0851; H05B 37/0227; H05B 37/0281
See application file for complete search history.

(56) References Cited

U.S. PATENT DOCUMENTS

| 2005/0072908 | A1* | 4/2005 | Grunert | G01J 3/513 250/226 |
| 2005/0200315 | A1 | 9/2005 | Kwong et al. | |
| 2006/0245174 | A1 | 11/2006 | Ashdown et al. | |
| 2009/0001253 | A1* | 1/2009 | Blaut | G09G 3/3413 250/205 |
| 2010/0096993 | A1 | 4/2010 | Ashdown et al. | |
| 2010/0207531 | A1* | 8/2010 | Peker | H05B 33/086 315/152 |
| 2012/0232354 | A1* | 9/2012 | Ecker | A61B 5/046 600/300 |
| 2014/0042415 | A1* | 2/2014 | Park | H01L 51/5275 257/40 |
| 2014/0078772 | A1 | 3/2014 | Gaydoul et al. | |
| 2014/0117214 | A1* | 5/2014 | Mellot | G01J 1/44 250/214 AL |
| 2014/0169026 | A1* | 6/2014 | Cochran | G02B 5/02 362/555 |

FOREIGN PATENT DOCUMENTS

| DE | 102010043828 | 5/2012 |
| WO | 2012130497 | 10/2012 |

OTHER PUBLICATIONS

Written Opinion dated May 28, 2015 for corresponding International Application No. PCT/EP2014/075187.

English translation of International Preliminary Report on Patentability dated May 26, 2016 for corresponding International Application No. PCT/EP2014/075295, 7 pages.

English translation of International Search Report dated May 28, 2015 for corresponding International Application No. PCT/EP2014/075295, 3 pages.

Written Opinion dated May 28, 2015 for corresponding International Application No. PCT/EP2014/075295, 6 pages.

* cited by examiner

CONTROLLED COLOR LIGHT SOURCE

CROSS REFERENCE TO RELATED APPLICATIONS

This application is a continuation of International Application No. PCT/EP2014/075295 filed on Nov. 21, 2014, which claims benefit under 35 U.S.C. § 119(a) of German Patent Application No. 10 2013 112 906.4 filed Nov. 22, 2013, the entire contents of both of which are incorporated herein by reference

BACKGROUND

1. Field of the Invention

The invention generally relates to LED-based light sources. More particularly, the invention relates to controllable color light sources which can be controlled in terms of brightness and/or color shade.

2. Description of Related Art

LED lighting sources are widely used to provide energy-saving and flexible lighting devices. In contrast to gas discharge lamps, light sources with LEDs are distinguished by the fact that they are easier to dim, among other things. Also, with a combination of differently colored LEDs virtually any color shade can be adjusted.

LEDs are moreover distinguished by the fact that they generally have small light-emitting faces of high luminance. However, depending on the application, a larger light-emitting surface or a diffuse illumination might be desired. For this purpose, it is known from the prior art to employ light guides which distribute the light generated by the LEDs. Such an LED lighting device is known, for example, from WO 2012/130497 A1. According to this prior art, an LED lighting device is described that comprises two separate light guides which are arranged so that a respective end face of one light guide faces an end face of the other light guide, and so that an intermediate region is defined in which in the operating state the radiation of at least one LED is injected into the light guides via the end faces arranged adjacent to the intermediate region and is guided in the light guides, wherein the outer peripheral surface regions of the light guides include means for emitting radiation, which reflect the radiation guided in the light guides into the light guides so that in the operating state the radiation passes through the light guides and is laterally emitted from the light guides.

With such an arrangement, a linear illumination profile is obtained with an opening angle which may correspond to a fluorescent lamp with reflector.

The LED and/or the LED chip has an electronic evaluation and control unit associated therewith, which determines the color location and/or brightness, and in response thereto the LED or the LED chip is controlled so that specific operating conditions of the LED are adjusted. By selectively controlling the elements of the chip, mixing of the colors of the emitted radiation is achieved. Thus, the LED and therefore the lighting device is capable of emitting light of any desired color. However, the color location may vary depending on environmental conditions and on the age of the LEDs. This variation cannot be determined, and therefore the sensor is intended for measuring the intensity and color location of the radiation. By taking into account these values in the controlling of the LED or LED chip, it is possible to achieve a reproducible and permanently stable color location and reproducible and permanently stable intensity of the radiation emitted by the lighting device.

Now, starting from WO 2012/130497 A1, it would be desirable to be able to quickly adjust exact color locations and a desired change in the color location. If a light sensor is used which is integrated on an LED chip, as proposed in WO 2012/130497 A1, there is the problem that the light captured by the sensor may have a different hue than the emitted light, for example if due to the arrangement different proportions of the emitted light of the LED reach the sensor. On the other hand, if the sensor in arranged in the illuminated room, this would be annoying for structural and aesthetic reasons.

SUMMARY

The invention is therefore based on the object to provide a controlled color light source based on semiconductor light sources, with light guides and reflector layer, which has a high efficiency, simple configuration, permits a quick response to preset values for color location and intensity, and at the same time provides high accuracy in terms of color location and intensity so that visual differences between several light sources are minimized or avoided.

Accordingly, the invention provides a light source with at least two semiconductor light-emitting elements, the semiconductor light-emitting elements emitting light of different color, and the light source comprises a light guide into which the light emitted by the semiconductor light-emitting elements is injected, at least partially. The light guide is configured so that the light injected by the semiconductor light-emitting elements exits laterally from the light guide.

The light source further comprises an electronic control unit adapted to adjust the brightness of the semiconductor light-emitting elements, and a light sensor that is arranged so as to receive the light injected by the semiconductor light sources into the light guide and laterally exiting therefrom. The electronic control unit with the light sensor is configured for accumulating the sensor signals over an integration time interval, and for comparing the accumulated signals of the light sensor with a target value or target range and to change the brightness of the semiconductor light-emitting elements in response to the difference between the sensor signals and the target value or target range.

In the context of the invention, the term difference refers to a deviation, especially a difference in the amount or a discrepancy between the sensor signal and the target value or target range. So, if there is a deviation between the sensor signal and the target value or target range, the brightness of the semiconductor light source is changed, according to the invention, as a function of the amount of this deviation.

The integration time interval is preferably the time interval used for analog signal integration. It is as well possible to integrate or average digitized signals. However, an additional quantization noise is produced in this case, which is disadvantageous for the accuracy of the color control.

According to one embodiment of the invention, the electronic control unit is adapted to change the integration time interval as a function of the deviation from the target value or target range by setting a shorter integration time interval in case of a greater deviation. That means, the integration time interval is modified in response to the difference between the sensor signal and the target value or target range by setting a shorter integration time interval in case of a greater difference than in case of a smaller difference.

According to yet another embodiment of the invention, the electronic control unit is adapted to change the integration time interval in response to a change in the target value. If the target value changes, the difference between the target value or target range and the sensor signal which usually will have been adjusted by the electronic control unit to the previously valid target value or target range, changes accordingly.

Both embodiments described above may of course be combined as well.

Especially in case of very large and rapid changes of the color location predefined by the target value or target range, the control using the sensor values may even temporarily switched off completely in accordance with yet another embodiment of the invention. In this case, the color location is initially adjusted approximately at the semiconductor light-emitting elements by means of respective supply currents and/or voltages using stored values. Subsequently, the exact color location may again be adjusted with the feedback control based on the sensor values. Thus, according to this embodiment the electronic control unit is adapted, upon a change in the target value or target range, to pre-adjust the brightness of the semiconductor light-emitting elements on the basis of stored values, and then to adjust the color location more precisely on the basis of a comparison of the sensor signals with the target value or target range.

The capturing of the laterally emitted light by the sensor first of all ensures that the sensor actually receives the light from the individual semiconductor light-emitting elements as emitted by the light source and mixed in the light guide. In this way, true color adjustment is enabled. With the adjustment of the integration times of the sensor signals it is now possible to ensure an exact adjustment of the color location of the light source even with very small sensor signals. Thus, the sensor may now be installed or placed so that it receives only very little light, and therefore it will not interfere with the illumination field of the light source, without having to relinquish a quick adjustment of the color location. If a rapid and big change in the color location is desired, the inventive light source will initially perform a fast approximate adjustment toward the desired color location with short integration times, and will then effect an exact adjustment with the correspondingly more accurate values of the light sensor due to the longer integration times.

For this purpose, the electronic control unit is adapted to set the integration time interval to a value from a range between 10 milliseconds and 5 seconds, preferably from a range between 15 milliseconds and 3 seconds, depending on the deviation to the target value or target range. According to one exemplary embodiment, the integration time interval is altered continuously or in at least two steps between 20 milliseconds and 2 seconds.

The requirements of a fast response to a change in the color location and a high accuracy of the adjustment of the color location can normally only be met if much light impinges on the sensor. The invention, in contrast, allows both, high accuracy and a rapid response to a change request.

For a high efficiency of the light source, preferably a reflective element is provided which is arranged such that it reflects a portion of the light laterally emitted from the light guide. Since the invention now permits to exactly adjust the color location even with very low light intensities on the sensor, the light sensor may now be arranged so that it receives the light laterally exiting from the light guide and passing through the reflective element. Because of the inventive adaptation of the integration time of the control, the reflective element may be designed so that the proportion of transmitted light is very small. This is favorable for achieving a high efficiency of the light source. Therefore, according to a further embodiment of the invention it is contemplated that the reflective element is designed so that less than 20%, preferably not more than 5% of the light incident on the reflective element passes through the reflective element. Thus, the sensor receives only a very small portion of the light incident on the reflective element. Preferably, however, the reflective element transmits more than 2%, at least in the range in which the light sensor detects light, in order to achieve a sufficiently good sensitivity.

For a compact configuration of the light source it is preferred that the reflective element is formed by a reflective layer which extends around part of the circumference of the light guide. In this way, the lateral dimensions of the light source can be kept small, since the reflective layer and the light guide form a unit.

In order to achieve good mixing of the light from the individual semiconductor light sources in the light captured by the light sensor, it is furthermore favorable if the light received by the light sensor is scattered out of the light guide at a certain distance from the light entry end or from the front end or end face. If light is analyzed which is scattered out close to the end face, the intensity proportions of the semiconductor light-emitting elements might be different. According to one embodiment of the invention it is therefore contemplated that the light sensor is arranged so that it receives light which is laterally emitted at a distance from an end face of the light guide measured along the light conducting direction of the light guide, which distance corresponds to at least twice, preferably at least three times the transverse dimension of the light guide.

A large color space can be covered when the semiconductor light-emitting elements comprise a four-color LED array. In this case, at least one red emitting LED, at least one green or yellow emitting LED, at least one blue emitting LED, and at least one white light emitting LED is provided. In this way it is possible, for example, to modify the color temperature of white light by admixing the light from one or more of the red, green, and blue emitting LEDs to light from one or more white emitting LEDs. For light-emitting diodes and laser as the semiconductor light-emitting elements, the following spectral ranges are preferred for the emitted light: blue light: wavelength from 430 nm to 480 nm, green light: wavelength from 500 nm to 560 nm, red light: wavelength of at least 600 nm, preferably from 600 nm to 660 nm.

The invention shows its particular advantages especially in conjunction with a true-color sensor which mimics the color sensitivity of the eye. Such a sensor allows for a very accurate adjustment of the color location adapted to the sensitivity of the eye. Such sensors generally have a plurality of sensor areas with dichroic color filters, and these color filters mimic the spectral sensitivity of the cones of the human eye. Since dichroic filters exhibit a significant angular dependence, it is moreover advantageous to limit the angular range of the incident beam. For this purpose, a suitable aperture stop may be used. A disadvantage hereof is that the sensitivity of such a sensor is relatively small due to the masking out and filtering. With the inventive control of the adjustment of the color coordinates with adaptation of the integration time, this disadvantage is compensated. Therefore, according to one embodiment of the invention, a light sensor is provided which has a plurality of sensor areas with different dichroic filters and an aperture stop which limits the angular range of the light laterally emitted from the light guide and incident on the sensor areas to less than +/−15°. Furthermore, without limitation to the specific type of light sensor it is generally preferred that the light sensor is already configured for supplying color values in form of x, y, I coordinates as the sensor values. This facilitates the processing of the sensor values by the electronic control unit.

BRIEF DESCRIPTION OF THE DRAWINGS

The invention will now be described in more detail by way of exemplary embodiments and with reference to the accompanying figures. In the figures, the same reference numerals identify identical or equivalent elements. In the drawings.

DETAILED DESCRIPTION

Figure 1:
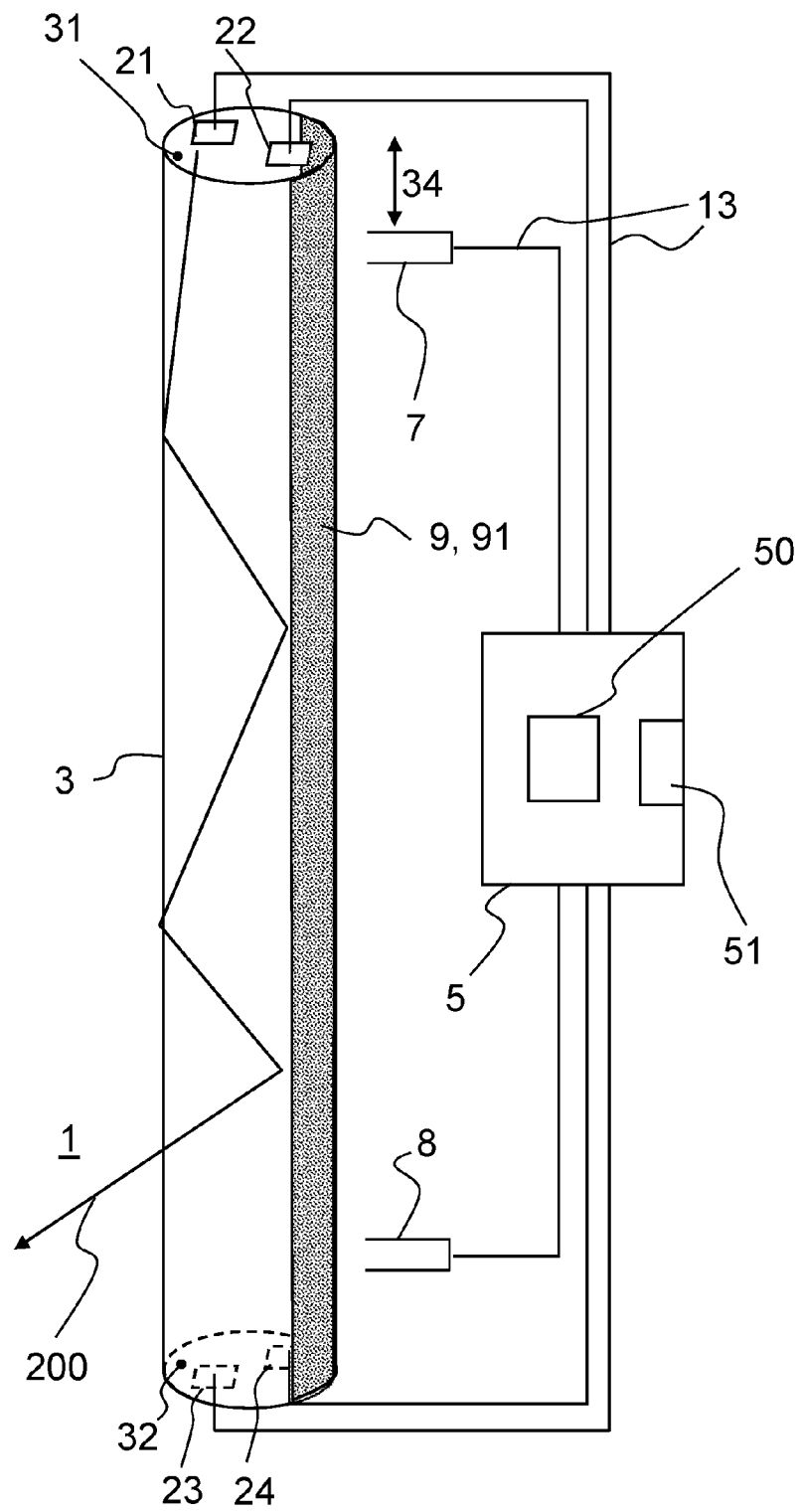
FIG. 1 schematically illustrates the configuration of an exemplary embodiment of the invention.

Like in the exemplary embodiment schematically illustrated in FIG. 1, a light source 1 according to the invention comprises at least two semiconductor light-emitting elements 21, 22 which emit light of different colors. This means that the light of the two semiconductor light-emitting elements differs in the color location, also referred to as color coordinates. Accordingly it is as well possible, for example, to provide two white light emitting semiconductor light-emitting elements which emit light of different color temperatures, for instance two semiconductor light-emitting elements 21, 22 which emit white light of 2700 K and 7000 K, respectively, to name an example. Without being limited to the specific exemplary embodiment of FIG. 1, light-emitting diodes (LEDs) are particularly preferred as the semiconductor light-emitting elements.

The light source 1 further comprises a light guide 3, into which the light emitted by the semiconductor light-emitting elements 21, 22 is injected, at least partially. An elongated light guide into which the light is injected into at least one of the end faces 31, 32 is preferred. For a better understanding, one light ray 200 emitted by semiconductor light source 21 is shown. The light injected by the semiconductor light-emitting elements 21, 22 into the light guide 3 at the end face 31 thereof, as exemplified by light ray 200, is conducted within the light guide 3 along the longitudinal extension thereof by total internal reflection. Thus, for an elongated light guide as shown in the example of FIG. 1, the longitudinal extension thereof is the direction of light conduction of the light guide 3.

The light guide 3 is configured so that the light injected from the semiconductor light-emitting elements 21, 22 exits sideways, i.e. laterally, from the light guide 3. This lateral or side emission is particularly preferably achieved by light scattering. If the light is scattered, the critical angle of total internal reflection can be exceeded due to the change in direction caused by the scattering, so that the light ray will exit through the lateral surface of the light guide 3. For this purpose, the light guide 3 is provided with appropriate light scattering features.

Preferably, without being limited to the particular exemplary embodiment shown in FIG. 1, a glass or plastic rod is used as the light guide 3. The light guide may be jacketed with a material having a lower refractive index or may have no jacket, at least in sections thereof.

The semiconductor light-emitting elements 21, 22 are connected to an electronic control unit 5 via electrical connections 13. This electronic control unit 5 is adapted to adjust the brightness of the semiconductor light-emitting elements 21, 22, for example by suitably adjusting the supply current if light-emitting diodes are used as the semiconductor light-emitting elements. In particular, without being limited to the exemplary embodiment, the brightness of the individual semiconductor light-emitting elements is adjusted separately from each other by the electronic control unit 5. However, if a plurality of semiconductor light-emitting elements of the same hue are employed, e.g. if the semiconductor light emitting element 21 would be replaced by two identical light-emitting elements, these semiconductor light-emitting elements similar in terms of hue can as well be controlled in brightness via a common control channel of electronic control unit 5.

Furthermore, light source 1 comprises a light sensor 7 which is arranged so that it receives the light injected by the semiconductor light-emitting elements 21, 22 and laterally exiting from the light guide 3. Light sensor 7 is also connected to the electronic control unit via an electrical connection. Electronic control unit 5 is now adapted to accumulate the sensor signals transmitted via the electrical connection 13 over an integration time interval, and to compare the accumulated signals from light sensor 7 with a target value or target range. Without being limited to the example shown in FIG. 1, this target value or target range specifies which hue and brightness or light intensity is intended to be emitted by light source 1. To this end, the electronic control unit 5 alters the brightness of the semiconductor light-emitting elements 21, 22 in dependence of the difference of the sensor signals to the target value or target range.

Without being limited to the particular illustrated exemplary embodiment, the difference of the sensor signals from the target value or target range may be determined as the amount of deviation for example by calculating a difference or a quotient. Accordingly, the electronic control unit 5 may determine a difference between the sensor signal and the target value or the limit of a target range closer to the sensor signal, and may then adjust the brightness in response to the amount of this difference. Another option, as mentioned before, is to determine a quotient of target value and sensor signals. Then, the greater the deviation from a target quotient, for example one, the greater is accordingly the difference between target value (or target range) and sensor signal.

In order to achieve high accuracy in adjusting the brightness of the individual semiconductor light-emitting elements 21, 22 and hence of the hue of the light emitted by light source 1 as a whole on the one hand, and on the other hand fast control, if required, the integration time interval is altered by the electronic control unit in dependence of the deviation of the sensor signals from the target value or target range, by setting a shorter integration time interval for the larger one of two different deviations than for the smaller one of the two deviations. In this way, when a different color location is requested, the light source 1 can quickly be adjusted to an approximate value of the requested hue and can subsequently perform an accurate adjustment to the target value by feedback control using longer integration time intervals.

The control scheme including the setting of the integration time interval is preferably performed by a microcontroller 50 being a component of the electronic control unit 5.

In order to transmit a change in color location, or, more generally, a request for setting a specific color location to light source 1, the latter preferably has an interface 51, via which color coordinate data are communicated to the light source 1, for example from a higher-level controller, without being limited to the specific configuration of FIG. 1. Alternatively or additionally, such a request may as well be triggered by the electronic control unit 5 itself. To name some examples, control may be performed by the electronic control unit as a function of the time of day or as a function of ambient light captured by a sensor.

As is furthermore exemplified in FIG. 1, the light guide may have two end faces 31, 32 at its opposite ends, and for both end faces 31, 32 at least two respective semiconductor light-emitting elements 21, 22, 23, 24 are arranged so that the light emitted therefrom is injected into the light guide 3 via the respective end face 31, 32. Specifically, in the example shown in FIG. 1, the two semiconductor light-emitting elements 21, 22 already mentioned above are arranged at end face 31, and two further light-emitting elements 23, 24 are arranged at the other end face 32, so that at both ends of light guide 3 light is injected by light-emitting elements 21, 22, and 23, 24, respectively, that are arranged there.

According to one embodiment of the invention, all the semiconductor light-emitting elements 21, 22, 23, 24 at both end faces 31, 32 of light guide 3 are controlled in brightness by electronic control unit 5 in response to the sensor signals from sensor 7.

According to yet another embodiment of the invention, the light injection into the two end faces 31, 32 may as well be controlled separately. Although this is technically more complex, it however allows to compensate for different aging-related shifts of the hue, among other things.

According to a further embodiment of the invention, a first light sensor 7 and a second light sensor 8 is provided, without being limited to the particular configuration shown in FIG. 1. Each of light sensors 7, 8 is associated with a respective one of the end faces 31, 32, so that each of light sensors 7, 8 receives a greater proportion of the light injected into the end face the relevant light sensor 7, 8 is associated with. This is simply achieved by the fact that each of the light sensors 7, 8 is arranged close to one of the end faces 31, 32. However, in order to obtain good mixing of the light from the individual semiconductor light-emitting elements at the location of the sensor, it is favorable to keep some distance 34 along the longitudinal extension of the light guide 3 between the light sensor 7, 8 and the associated end face 31 and 32, respectively. Preferably, therefore, the light sensor 7, 8 is arranged so that it receives light which is laterally emitted at a distance corresponding to twice, preferably at least three times the transverse dimension of the light guide 3. For the circular light guide illustrated in FIG. 1 this means that if the light sensor 7, 8 looks perpendicularly to the reflective layer 91, the distance 34 is chosen so that it corresponds to at least twice, preferably at least three times the diameter of the light guide.

Electronic control unit 5 is adapted to control the semiconductor light-emitting elements 21, 22, 23, 24 at each of end faces 31, 32 separately from each other and in response to the sensor signals from the sensor 7, 8 associated with the respective end face 31, 32. Preferably, however, the brightness of the semiconductor light sources 21, 22, and 23, 24 is controlled by comparing the accumulated signals of the respective light sensors 7, 8 with a common target value or target range. Accordingly, in this embodiment, the same color location as predefined by the target value or target range is adjusted at both ends of the light guide 3 by the control.

The light source 1 furthermore comprises a reflective element 9. Reflective element 9 is arranged so that it reflects part of the light that is laterally emitted from the light guide. In particular, reflective element 9 covers a circular arc along the circumference of the light guide 3, so that the light laterally exiting in the angular portion corresponding to the circular arc is reflected. In this case, the light source 1 may be installed so that the light reflected by the reflective element 9 is emitted into the room to be illuminated. Accordingly, increased efficiency is achieved with this reflective element 9 when installed in a wall, a ceiling or a floor. Light sensor 7, or both light sensors 7, 8 in the illustrated embodiment of the invention, are now disposed so that they receive the light laterally exiting from light guide 3 and passing through the reflective element 9. Therefore, when installed in or on a structural element such as a wall, a ceiling, or the floor of a vehicle or building, the light sensors will be arranged behind the light guide 3 as seen by an observer that looks at the light source 1, and will thus not be visible.

Furthermore, particularly preferably, like in the example shown in FIG. 1, the reflective element 9 is formed by a reflective layer 91 which extends around a portion of the circumference of the light guide 3. According to yet another refinement of the invention, the reflective element at the same time causes scattering of the light guided in light guide 3. For this purpose, the reflective element 9 has at least partially diffusely reflective properties, so that light conducted in the light guide 3 is scattered in a manner so that the scattered and thereby diffusely reflected light is laterally exiting from the light guide 3. The light exits laterally if the critical angle of total internal reflection at the wall of light guide 3 is exceeded due to the previous scattering. In other words, in this manner the reflective element 9 or reflective layer 91 at the same time serves as a means for ejecting the light from the light guide 3.

Such a diffusely reflecting reflective element may be produced with a layer of highly refractive particles, preferably particles having a refractive index of n>2. Suitable for this purpose is a coating including titanium oxide or niobium oxide particles. Most preferably, the highly refractive particles are embedded in a silicone matrix. Therefore, according to a further embodiment of the invention, without being limited to the particular embodiments illustrated in the figures, a reflective element 9 is provided in the form of a silicone coating with embedded light-scattering particles, in which the particles preferably have a refractive index greater than two.

However, due to the arrangement of the one or two sensor(s) 7, 8 behind the reflective layer 91, or more generally behind the reflective element 9, the amount of light incident to the respective sensor 7, 8 is considerably reduced. To enable the sensor 7, 8 to measure the light conducted in the light guide 3 even by sensing through the reflective element 9, the reflective element 9 is configured so that less than 30%, preferably not more than 20%, but preferably more than 5% of the light conducted in the light guide and incident on the reflective element 9 is transmitted through the reflective element 9.

Figure 2:
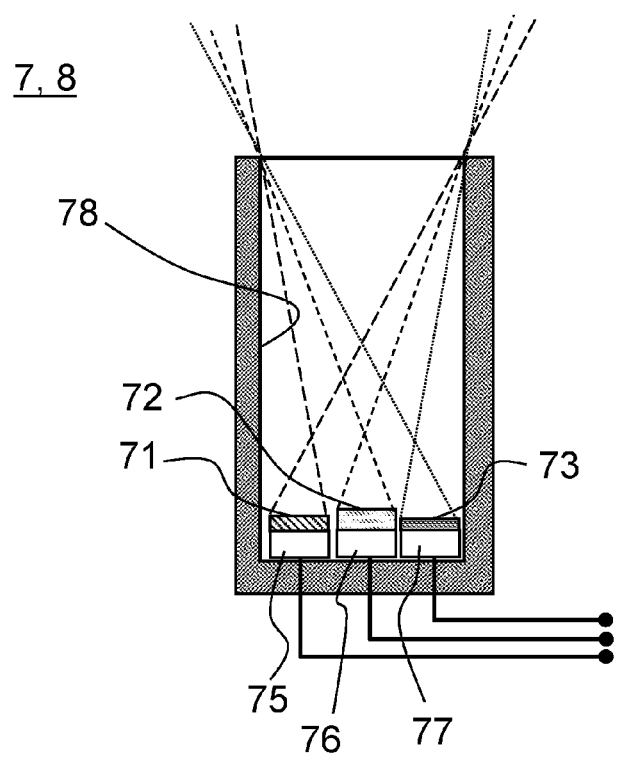
FIG. 2 schematically illustrates the configuration of a light sensor.

Another difficulty arising in the exact adjustment of the color location is that simple light-sensitive sensors have characteristics that do not or at most poorly match the sensitivity of the eye. However, in order to be able to exactly adjust to a specific color appearance and/or brightness, a light sensor 7, 8 is suitable which has a plurality of sensor areas with different dichroic or dielectric filters and an aperture stop 78 which limits the angular range of the light laterally emitted from the light guide and incident on the sensor areas. Preferably, the angular range is limited to less than +/−20°, more preferably to less than +/−15°. Such a light sensor is capable of simulating the color perception of the human eye and to convert it into corresponding sensor signals. FIG. 2 schematically shows such a light sensor.

Light sensor 7 and 8, respectively, has three sensor areas 75, 76, 77. These sensor areas 75, 76, 77 may be photodiodes or phototransistors, for example. Each of the sensor areas 75, 76, 77 has a dichroic filter associated therewith, 71 and 72 and 73, respectively, for spectrally filtering the light that reaches the associated sensor area 75, 76, 77. Dichroic filters 71, 72, 73 are now preferably configured so as to mimic the spectral sensitivity of the different types of cones of the human eye. Thus, light sensor 7, 8 represents a true-color sensor. Since the transmittance of such a dichroic filter is strongly dependent on the angle, an aperture stop 78 is provided which limits the range of angles of the incident light. In the example shown in FIG. 2, the aperture stop 78 is given by a cup-shaped housing. The angular limitation is caused herein by the spacing of the dichroic filters 71, 72, 73 to the opening of the cup. The marginal rays which just hit the sensor areas under a maximum angle are shown as dashed lines, for illustration purposes. Otherwise than illustrated in FIG. 2, the individual color channels are preferably represented multiple times on the sensor, in order to avoid an angular separation. In other words, a plurality of sensor areas 75, 76, 77 are provided on the surface in spatially distributed manner, so that the detected angle ranges are the same or substantially the same for the respective colors.

With such a light sensor 7, 8 it is now possible to reproduce very realistic lighting scenarios using the light source 1. However, a disadvantage is the reduced sensitivity of light sensor 7, 8 due to the aperture stop, which sensor moreover receives only the small portion of light transmitted through the reflective element. The resulting low light sensitivity of light sensor 7, 8 is counteracted by the inventive adaptation of the integration time by electronic control unit 5.

Figure 3:
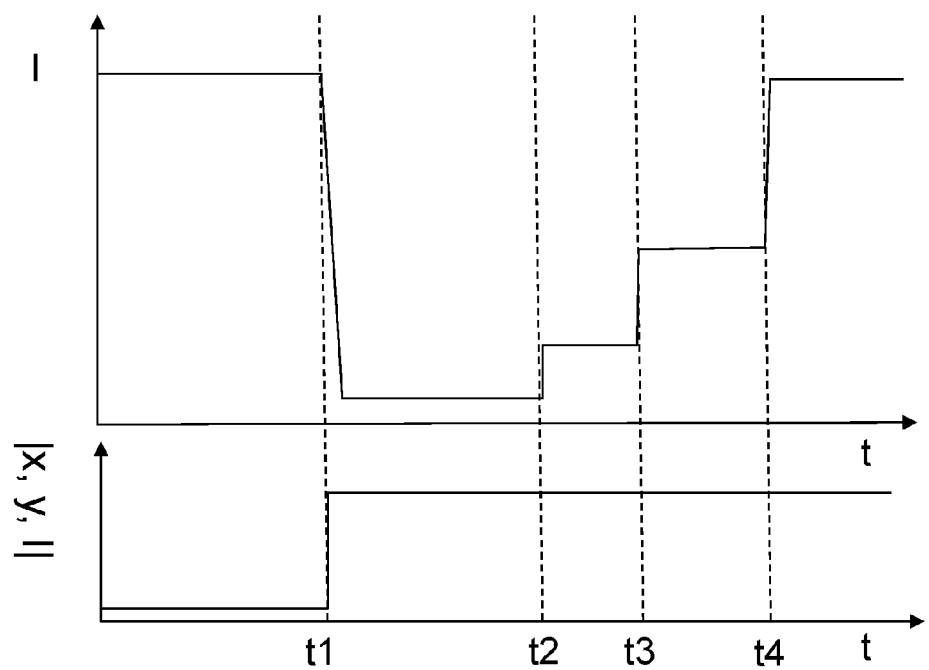
FIG. 3 is a graph of the change in a target value for color location and of the integration time interval over time.

FIG. 3 shows two graphs illustrating the change in a target value for the color location and the integration time interval over time. The lower graph represents the target value for the color location as a function of time. Here, the color location is represented in simplified form as a one-dimensional absolute value |x, y, I| of color coordinates x, y, and I. However, this absolute value is actually a good measure for the difference between the target value or target range and the sensor values provided by the light sensor. According to one embodiment of the invention, without being limited to the specific exemplary embodiments, it is therefore contemplated that the electronic control unit 5 sets the integration time interval in response to the difference between the absolute value of the color location as measured by the light sensor 7, 8 and the predefined target value or target range of the color location.

To illustrate this, the upper graph shows the timing of the adjustment of the integration time interval I by electronic control unit 5. As exemplified by the lower graph, the color location is initially constant and then changes abruptly at a time t1. The corresponding color values before and after time t1 may be transmitted to electronic control system 5 via an interface such as schematically shown in FIG. 1, for example. Since the color value changes at time t1, and electronic control unit 5 previously had exactly adjusted the color location to the target value, the difference between the adjusted color location and therefore also the difference between the sensor signal and the target value increases at time t1. Electronic control unit 5 is now configured to adapt the integration time interval in response to the change in the target value. Since the difference increases due to the change, electronic control unit 5 shortens the integration time. Accordingly, the magnitude of integration time I decreases in the upper diagram of FIG. 3. For example, in case of a strong change of the target value for the color location, the integration time interval can be shortened from 2 seconds to 20 milliseconds. Thus, the adjustment will be much less accurate initially, but yet will lead to an adaptation of the brightness of the individual semiconductor light-emitting elements toward the target value, due to the great difference between the target value and the sensor signal. Accordingly, the difference between the sensor values and the target value will progressively be reduced over time. Therefore, the integration time is then re-extended by electronic control unit 5. In the example shown in FIG. 3, electronic control unit 5 is adapted to gradually adjust the integration time interval in steps, at times t2, t3, and t4 in the present case. However, it is likewise possible for the electronic control unit 5 to be adapted for continuously adjusting the integration time interval.

The adjustment may be performed in several ways. The most accurate way is to adapt the integration time interval in response to the actually measured difference between the sensor values and the target value. However, it is also possible to initially shorten the integration time after a change in the target value, and then simply to re-extend the integration time as a function of time.

However, in both cases the integration time interval is first reduced by the electronic control unit 5 upon a change in the color location, and is then re-extended as a function of time or directly in response to the difference between the color values as measured by light sensor 7 and the new target value or target range. Accordingly, in one embodiment, without limitation to the specific exemplary embodiments illustrated in the figures, the electronic control unit 5 is adapted to shorten the integration time interval in response to a change in the target value or target range, and then to re-extend the integration time interval stepwise or continuously.

Especially if the change in the target value for the color location is very large, the adjustment of the brightness of the semiconductor light-emitting elements may initially even be made without any feedback of the sensor values, according to yet another embodiment of the invention. For this purpose, the electronic control unit 5 is accordingly adapted to first pre-adjust the brightness of semiconductor light-emitting elements 21, 22, 23, 24, 210, 211, 212 on the basis of stored values when the target value or target range changes. Subsequently, for example after a predetermined time period has elapsed, the color location is then again adjusted by the electronic control unit 5 as described above, on the basis of a comparison of the sensor signals with the target value or target range. The temporary switch-off of the feedback of the sensor values may as well be considered equivalent to a change in the integration time to zero.

These various embodiments of control may as well be combined. In the example shown in FIG. 3, feedback control may be switched off by the electronic control unit 5 between times t1 and t2, for example, in response to the sensor values, and at time t2 feedback control may then be re-enabled and the integration time can be increased in steps, as illustrated, or alternatively continuously.

Figure 4:
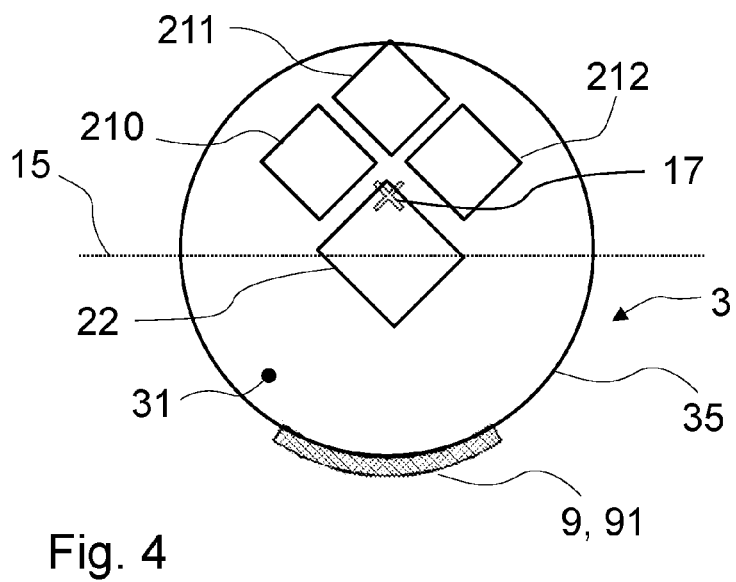
FIGS. 4 and 5 are plan views of an end face of the light guide with semiconductor light-emitting elements arranged thereon.
Figure 5:
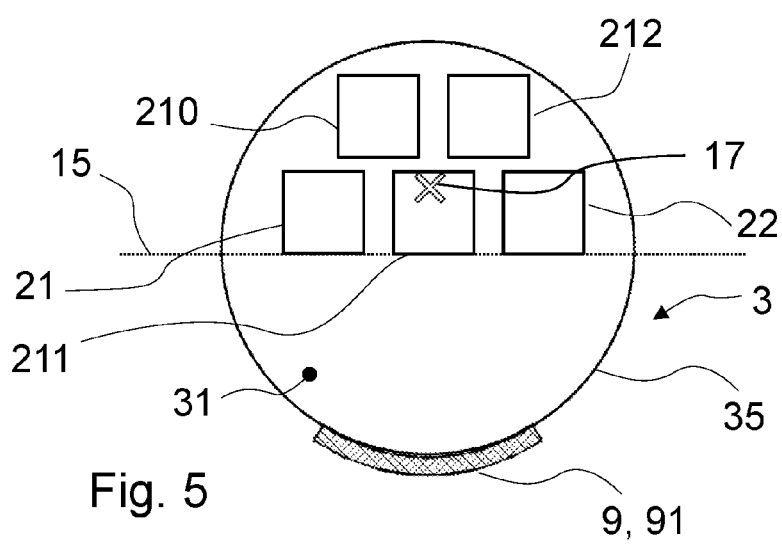

In the schematically illustrated example of FIG. 1, two semiconductor light-emitting elements 21, 22, and 23, 24, respectively, are provided at each end face 31, 32, and the semiconductor light-emitting elements arranged at each respective end face emit colors different from each other. In order to increase the color space that is adjustable with the light source 1, it is however preferred to provide at least three, preferably at least four differently colored semiconductor light-emitting elements at an end face. FIGS. 4 and 5 show two examples of a particularly advantageous arrangement of semiconductor light-emitting elements. This arrangement is not only advantageous in terms of a wide color space that can be covered, but also with regard to the homogeneity of the light field emitted by light guide 3.

In the exemplary embodiment shown in FIG. 4, the light guide 3 is provided in the form of a glass or plastic rod having a circular cross section. On the lateral surface, a reflective element 9 is applied in the form of a reflective layer 91 which extends around a portion of the circumference of the light guide 3. As already explained with reference to FIG. 1, a diffusely reflecting and hence light-scattering reflective layer 91 is preferably employed, which at the same time serves to partially scatter the light reflected on lateral surface 35 in a manner so that the critical angle of total internal reflection is exceeded and as a result the light exits from light guide 3.

Four semiconductor light-emitting elements 22, 210, 211, 212, are arranged at the end face 31, preferably light-emitting diodes. Semiconductor light-emitting element 210 emits red light, semiconductor light-emitting element 211 blue, and semiconductor light-emitting element 212 green light. Semiconductor light-emitting element 22 emits white light. The blue light preferably has a wavelength in the range: 430 to 480 nm. For the green light a range from 500 to 560 nm is preferred, and for the red light a range from 600 to 660 nm. The white light preferably has a color temperature from 2700 K to 7000 K.

Because of the symmetry of the arrangement with respect to a center line through the center of end face 31 and reflective layer 91 it is also possible to swap the positions of the red and green emitting semiconductor light-emitting elements 210 and 212. All semiconductor light-emitting elements 22, 210, 211, 212 are controlled separately in brightness, by electronic control unit 5. Accordingly, the light source is adapted to separately adjust four colors, or hues, and to mix them through the conduction of the light in the light guide 3.

Also indicated is an imaginary center line 15 through the center of end face 31, which divides the end face 31 into two equal halves, wherein the reflective layer 91 is applied in the middle of the circumference of one half. As is apparent from the arrangement of semiconductor light-emitting elements 22, 210, 211, 212, the center of gravity 17 of the light-emitting areas of all the semiconductor light-emitting elements is offset with respect to the center line 15 and therefore also with respect to the center 310 of end face 31 in a direction away from the reflective layer 91. This arrangement has proven to be particularly favorable for achieving rapid mixing of the individual colors of the semiconductor light-emitting elements already at the end of light guide 3 with the respective end face.

In conjunction with the color adjustment according to the invention, however, a particular advantage obtained thereby is that the light sensor 7 receives light that is well mixed, so that the high accuracy according to the object of the invention in controlling the color location is improved. However, this arrangement is also advantageous in conjunction with a color adjustment other than that of the invention. Without being limited to the features specified herein, the invention therefore also relates to a light source 1, comprising at least two semiconductor light-emitting elements 21, 22, 23, 24, 210, 211, 212, wherein the semiconductor light-emitting elements 21, 22, 23, 24, 210, 211, 212 emit light of different color, wherein the light source 1 comprises a light guide 3 with an end face 31 at which the semiconductor light-emitting elements 21, 22, 23, 24, 210, 211, 212 are arranged and into which the emitted light is injected at least partially, and wherein a light-scattering and diffusely reflecting reflective layer 91 is disposed on the light guide 3 and extends around a portion of the circumference of the light guide 3, and wherein the center of gravity 17 of the illuminated areas of all semiconductor light-emitting elements on end face 31 is offset relative to the center 310 of the end face 31 in a direction away from the reflective layer 91.

FIG. 5 shows another exemplary embodiment. In this exemplary embodiment, five semiconductor light-emitting elements 21, 22, 210, 211, 212 are arranged at end face 31. Like in the example shown in FIG. 4, semiconductor light-emitting elements 210, 211, 212 emit red, blue, and green light, respectively. Additionally, two white light emitting semiconductor light-emitting elements 21, 22 are provided. These two semiconductor light-emitting elements 21, 22 preferably emit white light of different color temperatures. If however two identical semiconductor light-emitting elements 21, 22 are provided, they may as well be controlled jointly by electronic control unit 5. Otherwise, each different color is controlled separately, as in the other exemplary embodiments.

By using red, green and blue emitting semiconductor light-emitting elements, as in the examples of FIGS. 4 and 5, it is not only possible to produce colored light, by admixing colored components it is also possible to produce white light, in particular in a range of color temperatures from 2700 K to 6500 K, with a high color rendering index of greater than 80, preferably greater than 90.

In the examples of FIG. 4 and FIG. 5, at least one white emitting semiconductor light-emitting element is provided.

Alternatively, however, the following configurations may be used as well, without being limited to the specific arrangement of the light-emitting elements shown in FIGS. 4 and 5: Red, green, and blue light is injected into the light guide, preferably with the wavelengths described above. White light can then be generated by mixing the three colors. An RGBA configuration of semiconductor light-emitting elements is provided. In addition to the red, green, and blue emitting semiconductor light-emitting elements, at least one yellow-orange emitting semiconductor light-emitting element is additionally provided (amber hue: 575 nm-600 nm).

In the exemplary embodiments shown so far, only a single light source 1 or a single light guide 3 has been described. However, the invention is also particularly suited to arrange a plurality of such light sources 1 in succession to provide a linear, homogeneously luminous lighting device.

Figure 6:
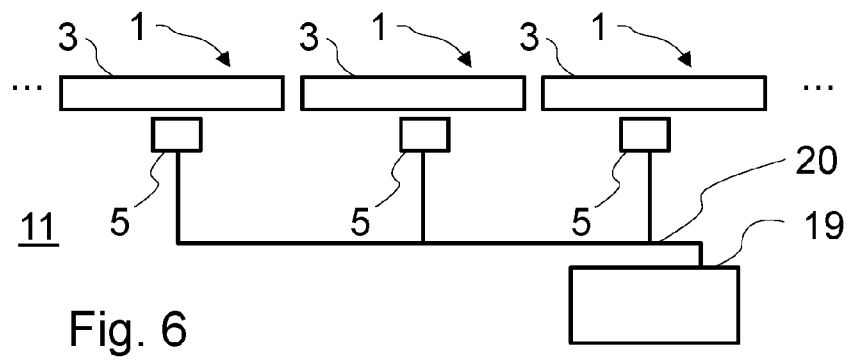
FIG. 6 shows a lighting device comprising a plurality of light sources.

For this purpose, according to one embodiment of the invention without being limited to the specific configuration of the exemplary embodiments illustrated in the preceding figures, a lighting device 11 as shown in FIG. 6 is provided. Lighting device 11 comprises a plurality of light sources 1 according to the invention and a control device 19 and a data line 20. Control device 19 is adapted to issue data representing color values. Data line 20 connects the electronic control units 5 of the individual light sources 1 with control device 19. Electronic control units 5 in turn are adapted to store the color values received via data line 20, in particular via an existing interface 51 as shown in the exemplary embodiment of FIG. 1, as target values or target ranges, and to alter the brightness of the semiconductor light sources in response to the difference between the sensor signals from the light sensors and a received color value. For the sake of simplicity, the light sensors 7 and the semiconductor light-emitting elements are not shown in FIG. 6. However, each of light sources 1 is configured according to the invention and comprises, in addition to the illustrated light guide 3 and to electronic control unit 5, at least two semiconductor light-emitting elements and at least one light sensor. Control device 19 outputs the color values preferably intermittently, for example every 40 milliseconds, via data line 20. In this way, the illumination can be controlled centrally by means of control device 19 in a simple and quick manner. In order to obtain a linear illumination, the light guides 3 of the light sources in the exemplary embodiment shown in FIG. 6 are arranged in succession so that the end faces of successive light guides 3 are facing each other.

Such an arrangement of light guides is also known from WO 2012/130497 A1. However, a gap or intermediate space is resulting between the individual light guides 3 in this case.

Figure 7:
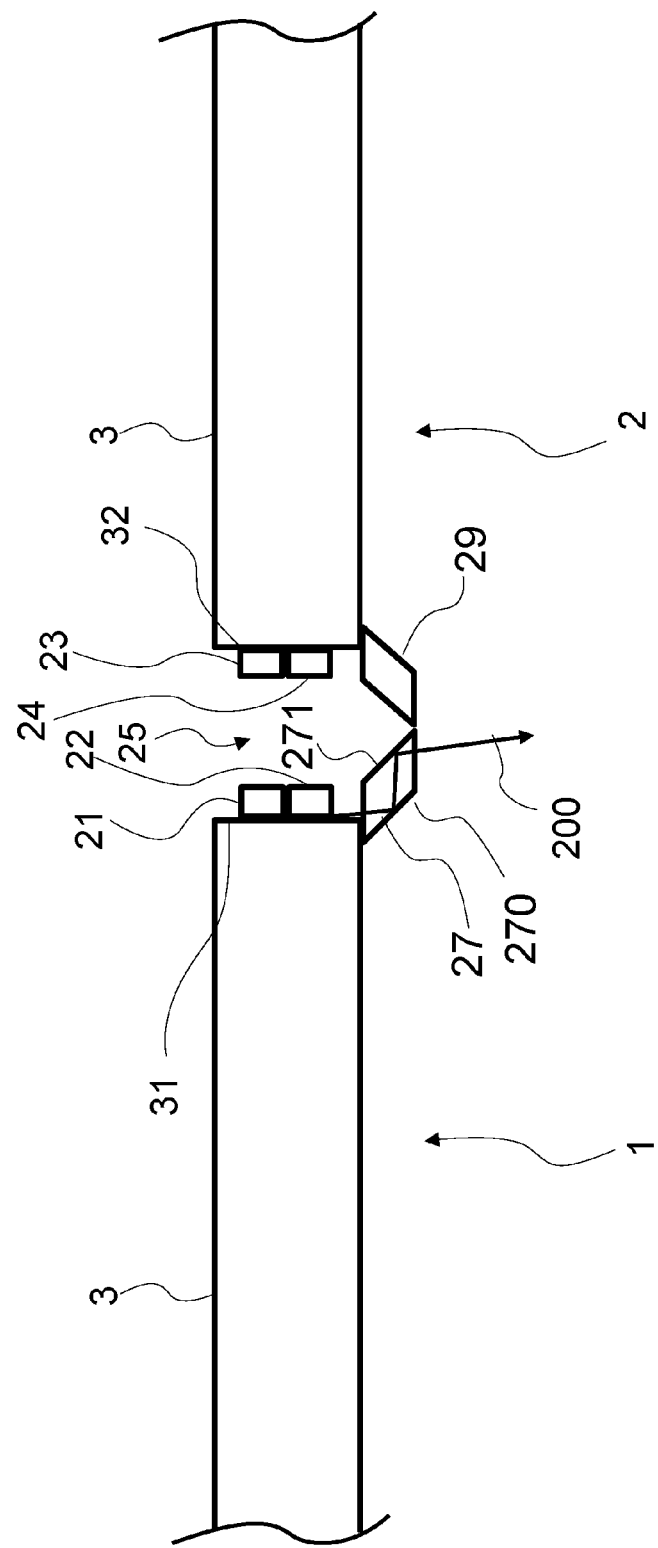
FIG. 7 shows a region between two light guides of two successively arranged light sources.

When a plurality of light sources according to the invention are arranged successively, the homogeneity of the emitted light field may now be further improved by deflecting light that is laterally emitted from the semiconductor light-emitting elements and irradiated it into the region between the two end faces of adjacent light guides. FIG. 7 shows the region between two light guides 3. The light guides 3 of two light sources 1, 2 according to the invention are arranged one behind the other in longitudinal direction so that the end faces 31, 32 of the two light guides 3 are facing each other in juxtaposition. Now, in order to achieve most homogeneous illumination, generally, irrespectively of an electronic control unit, the matching of color values with sensor signals, and the adaptation of an integration time interval, a lighting device is provided with the following features exemplified in FIG. 7:

The lighting device comprises at least two light guides 3 and at least one semiconductor light-emitting element 21, 22, and 23, 24, respectively, for each of the light guides 3. The light guides 3 are arranged with their end faces 31, 32 spaced apart from each other, and the semiconductor light-emitting elements 21, 22, 23, 24 are arranged in the intermediate space 25 between the end faces 31, 32, so that the light from the semiconductor light-emitting elements is injected into the light guides 3 via the end faces 31, 32 thereof, and the injected light is conducted along the longitudinal extension of the light guides 3 and re-emitted laterally over the length of the light guides 3. At least one prism 27, 29 is provided adjacent to or in the intermediate space 25, which is arranged and adapted so that in a first reflection light that is laterally emitted by the semiconductor light-emitting elements is deflected in a direction away from the end face 31, 32, and in a second reflection this deflected light is deflected transversely to the longitudinal extension of the light guide 3 and is emitted. In the exemplary embodiment shown in FIG. 7, two prisms 27, 29 are provided. However, it is likewise possible to use a single prism having respective refractive faces. In order to achieve twofold light redirection and subsequent lateral emission as described above, it is favorable if the prism(s) 27, 29 has/have, for each light guide 3, two reflective surfaces extending obliquely to the longitudinal extension of the light guide 3. These reflective faces on prism 27 are denoted by reference numerals 270, 271. In particular, both reflective faces 270, 271 extend outwards, obliquely to and away from end face 31. For a better understanding, the beam path of a light ray 200 laterally emitted by semiconductor light-emitting elements 21, 22 is indicated. The laterally emitted light ray 200 first enters the prism 27 and is deflected in a direction away from end face 31 by the first reflective face 270 that extends obliquely to the longitudinal extension of the light guide 3 of light source 1. The second reflective face 271 which in this example extends in parallel to reflective face 270, redirects the light ray back into its original direction laterally outwards, away from light guide 3, but now, due to the double reflection, from a point offset from end face 31 to intermediate space 25. This embodiment is also advantageous in conjunction with the inventive adaptation of the integration time interval, since the light laterally emitted from the semiconductor light-emitting elements is also used to achieve a high efficiency and homogenous illumination.

In the examples shown so far, the light of the semiconductor light-emitting elements is directly injected into the end face of light guide 3. This is advantageous for a high efficiency. The arrangement of the semiconductor light-emitting elements as shown in FIG. 4 and FIG. 5 improves the color homogeneity of the emitted light. However, in the region of the light guide close to the end face 31, color variations may still arise, because of the different lengths of the paths of the light rays to the lateral surface of the light guide. A particularly high degree of homogeneity of the laterally emitted light can now be achieved with an embodiment schematically illustrated in FIG. 8. The light source 1 comprises a light mixer 40 having a light entry area 41 and a light exit area 42. The light from semiconductor light-emitting elements 21, 22 is injected into light mixer 40 via light entry area 41. Within light mixer 40 the light is guided by reflection at the wall thereof. Thus, light mixer 40 itself is a light guide. As can be seen from FIG. 8, the longitudinal extension or light propagation direction of light mixer 40 is transversely to the longitudinal extension of light guide 3. In order to be able to inject the light that is conducted transversely to the longitudinal extension of light guide 3 into the end face 31 of light guide 3, a light deflecting means 43 with a reflective face 44 is arranged so as to deflect the light toward the end face 31. The light deflecting means may be a mirror or a prism or a prism with mirrored reflective face 44, for example. Preferably, the light mixer 40 extends along a radial direction of the light guide 3 that crosses the reflective layer 91 as seen in an elevational view of end face 31. Thus, the light mixer extends in a direction opposite to the light emission direction of light guide 3. In this way, the light mixer may be installed in a wall element without projecting into the space to be illuminated. Because of its high degree of homogeneity due to the spatial mixing of the light from the differently colored semiconductor light-emitting elements achieved in light mixer 40, this embodiment is very well suited in conjunction with the control of the integration time according to the invention which permits to quickly adjust an exact color location. Among other things, the light mixer 40 ensures that at the sensing location of light sensor 7, 8, the light most exactly corresponds to the mean color value of the emitted light. This configuration of the light source 1 may, however, as well be combined with another type of power supply or electronic control unit and is therefore independent of the control of an integration time.

Accordingly, the invention also relates to a light source 1 comprising at least two semiconductor light-emitting elements 21, 22, wherein the semiconductor light-emitting elements 21, 22 emit light of different color, and the light source comprises a light guide 3, which light guide 3 is configured so that the light generated by the semiconductor light-emitting elements 21, 22 is exiting laterally from the light guide, and wherein the light source comprises a light conducting light mixer 40, into which light emitted by the semiconductor light-emitting elements 21, 22 is injected at least partially, wherein the longitudinal extension of the light mixer 40 along which the latter conducts the light from the semiconductor light-emitting elements 21, 22 extends transversely to the longitudinal extension of the light guide 3, and wherein a light deflecting means 43 is provided which redirects the light conducted in the light mixer into the direction towards an end face 31 of the light guide, so that after having been deflected the light is injected into the end face 31 of the light guide 3.

If a plurality of light sources 1 are arranged in series and it is desired that light is emitted even from the intermediate space between the light sources, similarly to the embodiment illustrated in FIG. 7, the reflective face 44 may as well be designed so as to be partially reflective so that a small portion of the light mixed in light mixer 40 passes through the reflective face 44. For example, a prism may be provided as the light deflecting means 40, with a reflective face 44 that is metallized and in which the metallization is interrupted in sections in order to allow the passage of light. To this end, a small portion of the surface area of the reflective face may be masked during metallization, for example.

Figure 8:
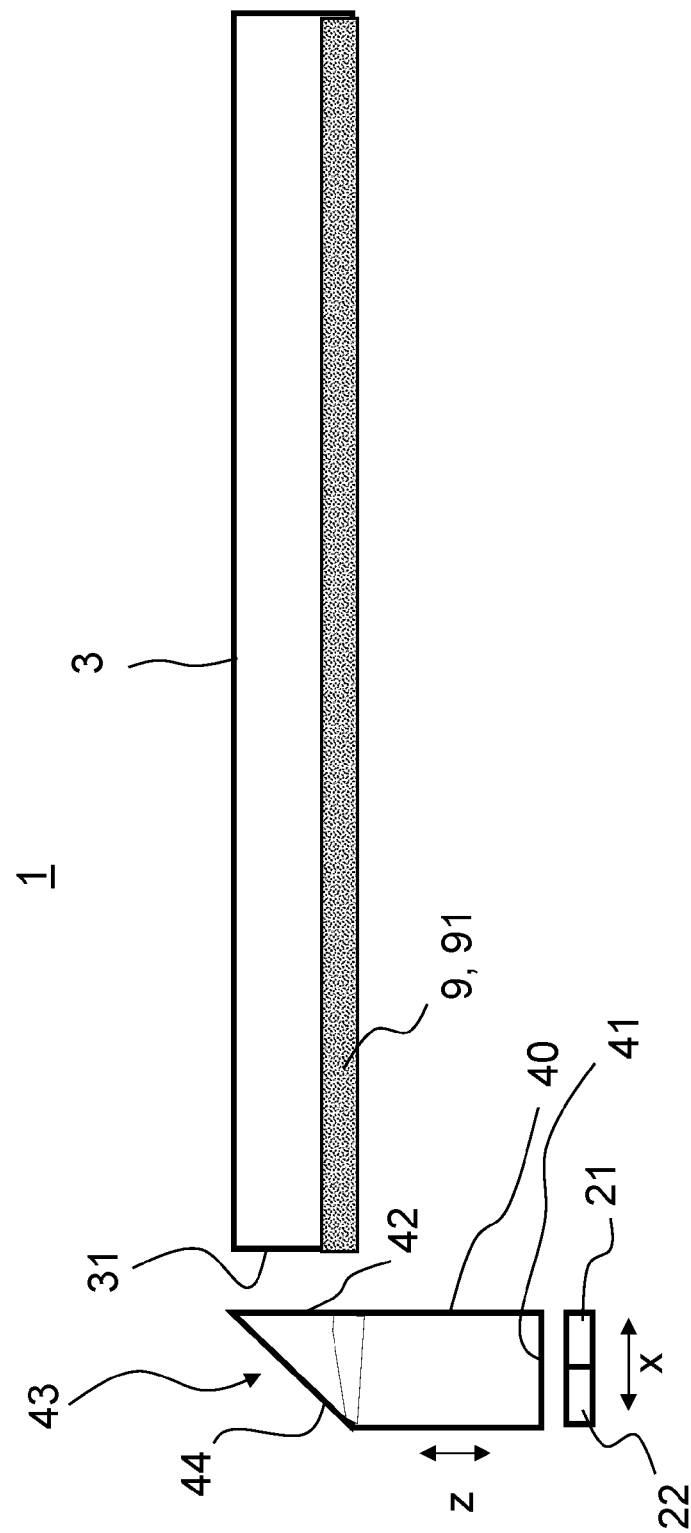
FIG. 8 shows an embodiment with a light mixer and light deflection upstream the injection into the light guide.

For high efficiency, generally, a light mixer such as shown in FIG. 8 should emit the light, after reflection, in such a manner that the largest possible proportion of the light is injected into the subsequent downstream optical element, which in particular is the light guide 3 here. It turns out, surprisingly, that to this end it is favorable to choose different aspect ratios, i.e. ratios of perpendicular dimensions, for the light entry and light exit areas. In particular, for optimum efficiency these ratios depend on the geometry of the light entry area of the downstream optical element, such as the shape of the light entry area of light guide 3.

According to one embodiment of the invention, an optical arrangement is provided for this purpose that comprises a first optical element in the form of a second light guide (to distinguish it from laterally emitting light guide 3) which is obliquely beveled with a bevel face and which defines the light conducting light mixer 40, and a second optical element, wherein the second optical element is the light guide 3 or an intermediate optical element between the light mixer and the light guide 3, wherein the first optical element, or the second light guide, conducts light by total internal reflection at the wall thereof and has a light entry area defined by the non-beveled end face of the second light guide, and has a light exit area, wherein the light exit area is defined by a surface area of the wall at that end of the light mixer 40 or the second light guide, at which the bevel face is arranged. The second optical element has a light entry aperture which is arranged on the light exit area of the first optical element or faces the light exit area of the first optical element or light mixer 40, and the light entry area of the first optical element or second light guide has a width x measured in the direction along the intersection of the light entry area with the plane of light deflection at the bevel face, and the light entry aperture of the second optical element has a height z measured in the direction along the intersection of the light exit area of the second light guide with the plane of light deflection at the bevel face.

The width x and the height z meet the following relationship:

$$x/z \leq 1.5 \cdot [\tan(90°-\alpha/2)-\tan(90°-(2 \cdot [\alpha/2+90°]-[180°-\arcsin(1/n)]))]^{-1}, \quad (1)$$

wherein α denotes the deflection angle of the light at the bevel face, and n denotes the refractive index of the material of the second light guide. Without limiting generality, the coordinate system has been chosen so that the deflection of the light only occurs in the x-z plane.

The bevel face here defines the light deflecting means 43 of the light mixer and is the reflective face 44 shown in FIG. 8. The light from the semiconductor light-emitting elements is redirected at the bevel surface towards light guide 3, by total internal reflection and/or by reflection at a reflective material arranged on the bevel face. The light mixer preferably has the shape of a prism, and the light entry area 41 thereof is defined by the non-beveled base of the prism. A prism in the sense of the invention is a body which is formed by parallel displacement of a base, that means in the case of the invention by parallel displacement of the light entry area. The base need not necessarily be angular. Rather, the base or the cross-sectional area of the prism may have round circumferential portions as well.

For a better understanding, the x-direction and the z-direction are indicated in FIG. 8.

In terms of efficiency, large values of the dimension z are favorable, however, the increase of intensity that can be injected into the second optical element decreases for large values of z, while the second optical element becomes more and more voluminous. Therefore, it is advantageous according to a further embodiment of the invention, if the height z of the second optical element is limited in relation to the width of the light entry area of the first optical element. Specifically, it is therefore contemplated according to a further embodiment of the invention, that the dimensions x and z additionally meet the following relationship:

$$x/z \geq 0.85 \cdot [\tan(90°-\alpha/2)-\tan(90°-(2 \cdot [\alpha/2+90°]-[180°-\arcsin(1/n)]))]^{-1}, \quad (2)$$

A deflection of the light by 90° at the bevel face is particularly space-saving. In the arrangement shown in FIG. 8 this is likewise the case. According to this preferred embodiment with a deflection by 90°, the following relationship is resulting between the height z of the light entry aperture of the second optical element, preferably the end face 31 of light guide 3, and the width x of the light entry area of the second light guide:

$$x/z \leq 1.5 \cdot [1+\tan(\arcsin(1/n))]^{-1}, \quad (3)$$

wherein n is the refractive index of the material of the second light guide.

In correspondence to the more general relationship (2), the following preferably additionally applies for the ratio x/z:

$$x/z \geq 0.85 \cdot [1+\tan(\arcsin(1/n))]^{-1}. \quad (4)$$

The shape of the light entry aperture of the second optical element of the optical arrangement preferably has an aspect ratio from 0.8:1 to 1.2:1, more preferably from 0.9:1 to 1.1:1, most preferably of 1:1, for two mutually perpendicular directions. Especially with such an aspect ratio of about 1:1 and light deflection, the invention provides for a high coupling efficiency. An aspect ratio y/z of 1:1 is for example given when the second optical element is formed by the light guide 3 and the latter has a circular or square cross-sectional area.

In order to improve the efficiency of light injection into light guide 3, specific cross-sectional shapes of the light mixer 40 in the form of a prism-shaped light guide have proved to be advantageous, alternatively or additionally to the embodiment of the invention described above.

Therefore, according to another aspect of the invention, a light mixer is provided in the form of a prism-shaped second light guide obliquely beveled with a bevel face that defines a reflective face 44, wherein the light mixer conducts light by total internal reflection at the wall 22 thereof, and has a light entry area 41 defined by the non-beveled end face of the light mixer, and has a light exit area 42, wherein the light exit area 42 is defined by a surface area of the wall at that end of the light guide at which the bevel face is arranged, and wherein the cross-sectional area of the light mixer 40 has a shape with dimensions monotonically expanding in a direction from the surface facing away from the light guide 3 towards the light guide 3, and strictly monotonically expanding in at least one section along this direction.

Such cross-sectional shapes have also turned out to be particularly favorable in terms of efficiency of the optical system. With such cross-sectional shapes it is achieved that light escaping at the light exit area so that it does not enter into the entry aperture of the downstream optical element is kept minimal.

Figure 9:
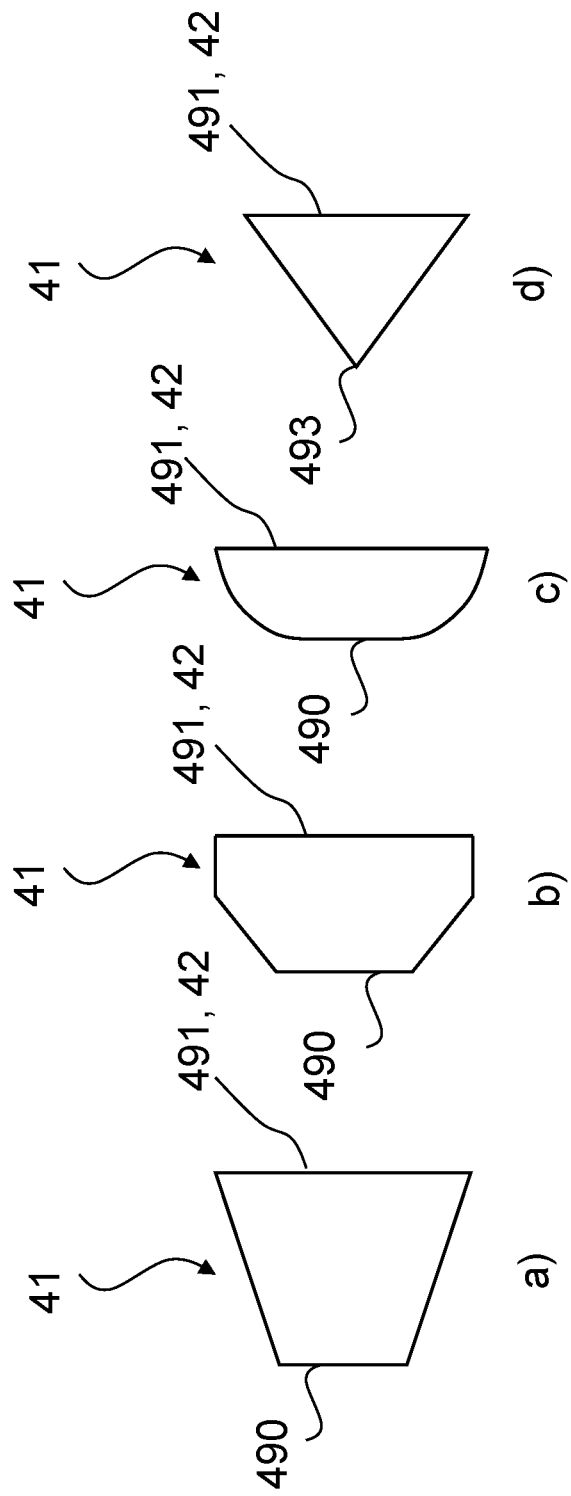
FIG. 9 shows examples of shapes of the base of the light mixer of the optical arrangement according to the invention.

FIG. 9 illustrates different examples of such cross-sectional areas of the light mixer. The shape of the cross-sectional area corresponds to light entry area 41.

FIG. 9 shows four different bases or cross-sectional areas of the light guide 40 according to further embodiments of the invention. These embodiments are based on the fact that the cross-sectional area of the light guide 40 has a shape with a dimension monotonically expanding in a direction from the surface facing away from the second optical element 3 towards the second optical element 3 and strictly monotonically expanding in at least one section along this direction.

Part a) of FIG. 9 shows a cross-sectional area with a width that is strictly monotonically increasing over the entire extension of the light guide from a face 490 to the opposite face 491 which includes the light exit area 42.

Part b) of FIG. 9 shows a cross-sectional area with a width that is initially monotonically increasing, from left to right in the drawing, and then remains constant.

In the exemplary embodiments of parts a) and b) of FIG. 9, the light guide has flat wall sections. However, it is as well possible to provide rounded walls, as in the example shown in part c) of FIG. 9. In the cross-sectional area of the light guide of this exemplary embodiment, the wall sections in which the cross-sectional dimension is strictly monotonically increasing are rounded.

Part d) of FIG. 9 shows a triangular base. Accordingly, there is no face existing opposite to light exit area 42, rather, the cross section widens starting from an edge 493 toward face 491.

As has been illustrated with reference to FIG. 1 above, face 491 includes the light exit area 42. All exemplary embodiments of FIG. 9 have in common that due to the monotonic and at least partially strictly monotonic expansion of the dimension of the cross section toward light exit area 42 (i.e. from left to right with the illustrated orientation of the exemplary embodiments) the cross section and thus the light entry area 41 has its largest dimension at the light exit area 42, or the associated face 491.

It will be apparent to those skilled in the art that the invention is not limited to the exemplary embodiments but can be varied in many ways within the scope of the subject matter of the present application. For example, in the exemplary embodiments of FIGS. 4 and 5 light guides with a circular cross section have been described. However, polygonal, for example square or rectangular cross-sectional shapes are possible as well. Also, the light guide 3 may have a sheet-like shape.

Furthermore, in the embodiments shown in the figures, a single light guide is provided for each light source 1. However, it is likewise possible to connect a plurality of light guides in series. In this case, the light guides may be plugged together by means of a suitable coupling. Furthermore, in a further refinement of the example explained with reference to FIG. 1, two control circuits may be provided in electronic control unit 5, by means of which different color locations can be adjusted with the respective semiconductor light-emitting elements at the two end faces 31, 32 on the basis of the sensor values of the two light sensors 7, 8. With a lighting device 11 as schematically shown in FIG. 6 it is then possible in this manner to adjust for example a color gradient along the successively arranged side-emitting light guides 3 of the individual light sources 1. In order to transmit the individual color values, different target values or target ranges may then by supplied by the control device 19 to the electronic control units 5 of light sources 1 using suitable, e.g. telegram based, addressing.

LIST OF REFERENCE NUMERALS

1, 2 Light source
21, 22, 23, 24, 210, 211, 212 Semiconductor light-emitting elements
3 Light guide
5 Electronic control unit
7, 8 Light sensor
9 Reflective element
11 Lighting device
13 Electrical connection
15 Center line
17 Center of gravity
19 Control device
20 Data line
25 Intermediate space
27, 29 Prism
31, 32 End face
34 Distance
35 Lateral surface
40 Light mixer
41 Light entry area
42 Light exit area
43 Light deflecting means
44 Reflective face
50 Microcontroller
51 Interface
71, 72, 73 Dichroic filter
75, 76, 77 Sensor areas
78 Aperture stop
91 Reflective layer
200 Light ray
490, 491 Face
493 Edge

What is claimed is:

1. A light source, comprising:
at least two semiconductor light-emitting elements, the semiconductor light-emitting elements emitting light of different color;
a light guide into which the light is, at least partially, injected, the light guide being configured so that the light exits laterally from the light guide, the light guide having a longitudinal extension and an end face;
a light sensor arranged to receive the light injected by the semiconductor light-emitting elements into the light guide and laterally exiting therefrom, wherein the light sensor is spaced along the longitudinal extension by a distance of between the light sensor and the end face; and
an electronic control unit configured to accumulate sensor signals from the light sensor over an integration time interval of the brightness, determine a difference by comparing the accumulated signals with a target value or target range, change the brightness of the semiconductor light-emitting elements in response to the difference, and change the integration time interval in response to either the difference or a change in the target value or target range;
wherein the electronic control unit is configured to change the integration time interval in response to the change in the target value or target range by shortening the integration time interval and subsequently re-extending the integration time interval stepwise or continuously.

2. A light source, comprising:
at least two semiconductor light-emitting elements, the semiconductor light-emitting elements emitting light of different color;
a light guide into which the light is, at least partially, injected, the light guide being configured so that the light exits laterally from the light guide, the light guide having a longitudinal extension and an end face;
a light sensor arranged to receive the light injected by the semiconductor light-emitting elements into the light guide and laterally exiting therefrom, wherein the light sensor is spaced along the longitudinal extension by a distance of between the light sensor and the end face; and
an electronic control unit configured to accumulate sensor signals from the light sensor over an integration time interval of the brightness, determine a difference by comparing the accumulated signals with a target value or target range, change the brightness of the semiconductor light-emitting elements in response to the difference, and change the integration time interval in response to either the difference or a change in the target value or target range;
wherein the electronic control unit is configured to change the integration time interval in response to the difference by setting a shorter integration time interval in case of a greater difference than in a case of a smaller difference.

3. The light source as in claim 1, wherein the electronic control unit is configured to set the integration time interval to a value from a range between 10 milliseconds and 5 seconds.

4. A light source, comprising:
at least two semiconductor light-emitting elements, the semiconductor light-emitting elements emitting light of different color;
a light guide into which the light is, at least partially, injected, the light guide being configured so that the light exits laterally from the light guide, the light guide having a longitudinal extension and an end face;
a light sensor arranged to receive the light injected by the semiconductor light-emitting elements into the light guide and laterally exiting therefrom, wherein the light sensor is spaced along the longitudinal extension by a distance of between the light sensor and the end face; and
an electronic control unit configured to accumulate sensor signals from the light sensor over an integration time interval of the brightness, determine a difference by comparing the accumulated signals with a target value or target range, change the brightness of the semiconductor light-emitting elements in response to the difference, and change the integration time interval in response to either the difference or a change in the target value or target range;
wherein the electronic control unit is configured to respond to the change in the target value or target range by first adjusting the brightness based on stored values and by subsequently adjusting a color location based on the difference between the sensor signals and the target value or target range.

5. The light source as in claim 1, further comprising a reflective element arranged to reflect part of the light laterally emitted from the guide light, wherein the light sensor is arranged to receive the light laterally emitted from the guide light and passing through the reflective element.

6. The light source as in claim 5, wherein the reflective element is a reflective layer that extends around a portion of a circumference of the light guide.

7. The light source as in claim 6, wherein the reflective element is a silicone coating with embedded light-scattering particles, the light-scattering particles having a refractive index of greater than two.

8. The light source as in claim 6, wherein the reflective element passes less than 20% of light incident on the reflective element.

9. The light source as in claim 6, wherein the reflective element is at least partially diffusely reflective so as to scatter the light conducted in the light guide in such a manner that the light scattered and thereby diffusely reflected exits laterally from the light guide.

10. The light source as in claim 1, wherein the distance corresponds to at least twice a transverse dimension of the light guide.

11. The light source as in claim 1, wherein the semiconductor light-emitting elements comprise a four-color LED array including at least one red emitting LED, at least one green or yellow emitting LED, at least one blue emitting LED, and at least one white light emitting LED.

12. The light source as in claim 1, wherein the light sensor has a plurality of sensor areas with different dichroic filters and an aperture stop limiting an angular range of the light laterally emitted from the light guide and incident on the sensor areas to less than 90°.

13. The light source as in claim 1, wherein the light guide has two end faces at opposite ends thereof, and wherein, for each end face of the two end faces, the at least two semiconductor light-emitting elements are arranged so that the light emitted therefrom is injected into the light guide through the respective end face.

14. The light source as in claim 13, wherein the light sensor comprises a first light sensor and a second light sensor, wherein the first and second light sensors are is associated with a respective one of the two end faces so that the first and second light sensors receive a greater proportion of the light injected into the end face the light sensor is associated with, and wherein the electronic control unit is configured to control the two semiconductor light-emitting elements at each of the end faces independently from each other and on the basis of the sensor signals of the light sensor associated with the respective end face.

15. The light source as in claim 6, wherein the semiconductor light-emitting elements have light-emitting areas with a center of gravity on the end face that is offset relative to a center of the end face in a direction away from the reflective layer.

16. The light source as in claim 1, further comprising a light mixer and a light deflector, the two semiconductor light-emitting elements at least partially injecting light into the light mixer, wherein the light mixer has a longitudinal extension along which light is conducted that extends transversely to the longitudinal extension of the light guide, and wherein the light deflector is provided to redirect the light conducted in the light mixer towards an end face of the light guide so that after having been deflected the light is injected into the end face of the light guide.

17. The light source as in claim 16, wherein the light mixer comprises a second light guide obliquely beveled with a bevel face and having a light entry area which is defined by a non-beveled end face of the second light guide, and a light exit area which is defined by a surface area of a wall at that end of the second light guide at which the bevel face is arranged, and a second optical element is provided which is defined by the light guide or by an optical element interposed between the light guide and the light mixer, wherein the second optical element has a light entry aperture arranged on the light exit area of the light mixer or facing the light exit area of the first optical element, wherein the light entry area of the second light guide has a width x measured in the direction along the intersection of the light entry area with the plane of light deflection at the bevel face, and the light entry aperture of the second optical element has a height z measured in the direction along the intersection of the light exit area of the second light guide with the plane of light deflection at the bevel face, which meet the following relationship:

$$x/z \leq 1.5 \cdot [\tan(90°-\alpha/2)-\tan(90°-(2\cdot[\alpha/2+90°]-[180°-\arcsin(1/n)]))]^{-1},$$

wherein $\alpha$ denotes the deflection angle of the light at the bevel face, and n denotes the refractive index of the material of the second light guide.

18. The light source as in claim 17, wherein the height z of the light entry aperture and the width x meet the following relationship:

$$x/z \leq 1.5 \cdot [1+\tan(\arcsin(1/n))]^{-1},$$

wherein n denotes the refractive index of the material of the second light guide.

19. The light source as in claim 16, wherein the light mixer is a prism-shaped light guide obliquely beveled with a bevel face that defines a reflective face, wherein the light mixer has a cross-sectional area with a shape having dimensions monotonically expanding in a direction from the surface facing away from the light guide towards the light guide, and strictly monotonically expanding in at least one section along this direction.

20. A lighting device, comprising:
a plurality of the light sources claimed in claim 1;
a control device; and
a data line, wherein the control device is configured to output data that represents color values,
wherein the electronic control units of the light sources are connected to the control device via the data line, and
wherein the electronic control units are adapted to store the color values received via the data line as the target values or target ranges and to change the brightness based on the difference between the sensor signals and a received color value.

21. The lighting device as in claim 20, wherein the light guides of the light sources are arranged with end faces spaced apart from each other and the semiconductor light-emitting elements are arranged in an intermediate space between the end faces, so that the light from the semiconductor light-emitting elements is injected into the light guides via the end faces, and wherein the intermediate space has at least one prism provided adjacent to or in the intermediate space, the at least one prism being arranged and adapted so that in a first reflection light that is laterally emitted by the semiconductor light-emitting elements is deflected away from the end face, and in a second reflection this deflected light is deflected transversely to the longitudinal extension of the light guide and is emitted.

* * * * *